(12) United States Patent
Westra et al.

(10) Patent No.: US 8,731,849 B2
(45) Date of Patent: May 20, 2014

(54) HYDROSTATIC PRESSURE TESTING SYSTEM AND METHOD

(75) Inventors: Lubbert Westra, Thibodaux, LA (US); Michael W. Breaux, Youngsville, LA (US); Russell Richard, Jr., Eunice, LA (US); Christopher D. Wilson, Orange Grove, TX (US)

(73) Assignee: Greene's Energy Group, LLC, Houston, TX (US)

( * ) Notice: Subject to any disclaimer, the term of this patent is extended or adjusted under 35 U.S.C. 154(b) by 554 days.

(21) Appl. No.: 13/008,244

(22) Filed: Jan. 18, 2011

(65) Prior Publication Data

US 2011/0178736 A1   Jul. 21, 2011

Related U.S. Application Data

(60) Provisional application No. 61/296,093, filed on Jan. 19, 2010.

(51) Int. Cl.
*G06F 19/00* (2011.01)
(52) U.S. Cl.
USPC .............. 702/50; 702/51; 702/45; 702/47; 702/98; 702/99; 73/40.5 R; 73/49.5; 73/37
(58) Field of Classification Search
USPC ........... 702/50, 51, 45, 47, 98, 99; 73/40.5 R, 73/49.5, 37
See application file for complete search history.

(56) References Cited

U.S. PATENT DOCUMENTS

| | | | |
|---|---|---|---|
| 4,182,160 A | 1/1980 | Powers et al. | |
| 4,211,107 A | 7/1980 | Sleeter et al. | |
| 4,423,622 A | 1/1984 | Bartlett | |
| 4,858,464 A | 8/1989 | Miller et al. | |
| 5,295,392 A | 3/1994 | Hensel et al. | |
| 6,082,182 A | 7/2000 | Fierro et al. | |
| 6,418,804 B1 | 7/2002 | Zabala et al. | |
| 6,755,025 B2 | 6/2004 | Eleftheriou et al. | |
| 7,066,010 B2 | 6/2006 | Bryant et al. | |
| 2008/0017390 A1 | 1/2008 | Bowie | |
| 2009/0248324 A1* | 10/2009 | Hamilton et al. | 702/47 |

OTHER PUBLICATIONS

Int'l Search Report, Mar. 14, 2011, PCT/US11/021548.
Written Opinion, Mar. 14, 2011, PCT/US11/021548.

* cited by examiner

*Primary Examiner* — Jonathan C. Teixeira Moffat
*Assistant Examiner* — Hien Vo
(74) *Attorney, Agent, or Firm* — Jones Walker LLP

(57) ABSTRACT

A hydrostatic pressure testing system for hydrostatic pressure testing of pipe or other vessels. A control center may include a computer program that monitors, records, and controls the system during testing. A test fluid assembly may include a fill conduit capable of providing a test fluid to an inlet section of a vessel to be tested in response to a command from the computer program. A pressure-release safety assembly may have a vent conduit in fluid communication between an outlet section of the vessel and a safety valve. The safety valve may be in fluid communication with a bleed tank for storing an outlet flow of test fluid from the vessel. The safety valve is actuated to relieve fluid pressure in the vessel in response to a selective condition. A method of using the system to conduct hydrostatic pressure testing is also described.

29 Claims, 3 Drawing Sheets

HYDROSTATIC PRESSURE TESTING SYSTEM AND METHOD

CROSS-REFERENCE TO RELATED APPLICATIONS

This application claims the benefit of and priority to U.S. Provisional Patent Application No. 61/296,093, filed Jan. 19, 2010.

FIELD OF THE INVENTION

The present invention relates to a hydrostatic pressure testing system and method, and more particularly to an automatic hydrostatic pressure testing system and method for testing pipe or fluid pressure vessels.

BACKGROUND OF THE INVENTION

Hydrostatic testing provides a method of finding leaks and flaws in vessels used for pipelines, refineries, chemical plants, oil and gas drilling and production, plumbing, or other operations, and to determine whether a particular installation is suitable and safe for use with the working pressure to which it will be exposed. Newly manufactured sections of pipe are initially qualified using hydrostatic pipe testing. Used pipe may also undergo hydrostatic pipe testing.

For open-ended pipe, conventional pipe testing is conducted by sealing the ends of the pipe with flanges. These flanges are attached to the outer edge of the pipe generally by welding. The pipe is then filled with a nearly incompressible liquid (usually water or oil) and examined for leaks or permanent changes in shape. The test is usually performed at 1.5 times the working pressure to which the section of pipe will be exposed.

The attachment of flanges to the end of the sections of pipe requires a significant amount of time and expense. They will also need to be removed following the test in open-ended or modular systems.

Temporary external pipe end plugs are known. For example, United Kingdom Patent No. 2448036B, issued on Oct. 21, 2009, describes an external pipe end plug that hydraulically seals to the open end of pipe. United Kingdom Patent No. 2448036B is incorporated herein by reference.

Conventional hydro-testing equipment and practices are typically low-tech, require a long set-up, testing time, and disassembly, and suffer from numerous safety concerns. Because pipe is placed under high pressure, the chance of injury exists due to failure of the pipe plugs or the pipe itself, particularly if personnel are present near the pipe and if insufficient care is taken to remove as much air from the system as possible. Because air is compressible, inclusion of compressed air substantially increases the risk of catastrophic consequences of pipe or plug failure during hydro-testing. There is a need for an advanced, automated, and safe hydro-testing system and method for open-ended pipe.

SUMMARY OF THE INVENTION

It is an object of the present invention to provide a hydrostatic pressure testing system and method requiring less time and expense than conventional hydrostatic pressure testing systems.

It is a further object of the present invention to provide a hydrostatic pressure testing system and method that is considerably safer than conventional hydrostatic pressure testing systems.

It is a further object of the present invention to provide a hydrostatic pressure testing system and method that is self-contained.

It is a further object of the present invention to provide a hydrostatic pressure testing system and method that is portable.

It is a further object of the present invention to provide a hydrostatic pressure testing system and method that is highly accurate.

It is a further object of the present invention to provide a hydrostatic pressure testing system and method that may be monitored from a safe distance.

It is a further object of the present invention to provide a hydrostatic pressure testing system and method that is automated.

It is a further object of the present invention to provide a hydrostatic pressure testing system and method capable of simultaneously testing more than one section of pipe or pressure vessel.

It is a further object of the present invention to provide a hydrostatic pressure testing system and method for pipe.

It is a further object of the present invention to provide a hydrostatic pressure testing system and method for open-ended pipe.

It is a further object of the present invention to provide an open-ended pipe testing system and method that uses external pipe end plugs.

These and other objects and advantages are achieved by the novel hydrostatic pressure testing system and method. The hydrostatic pressure testing system may include a control center for operating the hydrostatic pressure testing system, a test fluid assembly, and a pressure-release safety assembly. The control center may include a computer control panel, a computer display screen, a computer storage device, and a computer program. The computer program may monitor, record, and control the system during hydrostatic pressure testing operations. The test fluid assembly may include a fill conduit capable of providing a test fluid to an inlet section of a vessel to be tested in response to a command generated by the computer program. The pressure-release safety assembly may include a vent conduit capable of providing a fluid communication between an outlet section of the vessel and a safety valve. The safety valve may be in fluid communication with a bleed tank for storing an outlet flow of the test fluid from the vessel. The safety valve may be capable of being actuated to relieve a fluid pressure in the vessel undergoing hydrostatic testing in response to a selective condition of the hydrostatic pressure testing system. The hydrostatic pressure testing system may also include a power generation assembly capable of generating power to operate the pressure testing system. The power generation assembly may include a generator.

The test fluid assembly may also include a test fluid tank for storing the test fluid and a fill pump in fluid communication with the test fluid tank. The fill pump may be capable of pumping the test fluid from the test fluid tank through the fill conduit to the inlet section of the vessel. The test fluid assembly may also include a filter in fluid communication with the test fluid tank. The filter may be capable of filtering the test fluid to remove impurities. The test fluid may be water or water and one or more additives.

The vessel may be a pipe, and the hydrostatic pressure testing system may further include a hydrostatic-pressure seal assembly capable of sealing the pipe so that a predetermined hydrostatic pressure may be applied and held in an internal section of the pipe during the hydrostatic pressure testing operations. The hydrostatic-pressure seal assembly may include a pair of seal means. The seal means may each include an internal pipe locking means or an external pipe locking means to secure the seal means to the pipe. The seal means may each be a mechanical seal, a pneumatically-actuated seal, or a hydraulically-actuated seal.

If the pipe is open-ended, the inlet and outlet sections of the pipe are inlet and outlet ends. In this embodiment, each seal means may be a hydraulically-actuated pipe end plug. One of the pipe end plugs may seal the inlet end of the pipe and the other pipe end plug may seal the outlet end of the pipe.

If each seal means is hydraulically-actuated, the pressure testing system may also include a hydraulic assembly capable of supplying a hydraulic fluid to actuate the hydraulically-actuated seal. The hydraulic assembly may include a hydraulic fluid reservoir, a hydraulic fluid pump in fluid communication with the hydraulic fluid reservoir, and a hydraulic fluid conduit providing fluid communication between the hydraulic fluid pump and the hydraulically-actuated seals to actuate the seals.

The hydrostatic pressure testing system may further include a fluid pumping assembly capable of increasing the fluid pressure within an internal section of the vessel during hydrostatic pressure testing operations. The fluid pumping assembly may include a first pump and a second pump each in fluid communication with the internal section of the vessel.

The hydrostatic pressure testing system may further include a test fluid evacuation assembly capable of evacuating the test fluid from the internal section of the vessel after hydrostatic pressure testing operations. The test fluid evacuation assembly may include an evacuation pump in fluid communication with the internal section of the vessel. The evacuation pump may be capable of pumping the test fluid remaining in the internal section of the vessel after hydrostatic pressure testing operations.

The safety valve may be a mechanical valve, a pneumatically-actuated valve, a hydraulically-actuated valve, or an electronically-actuated valve. If the safety valve is a pneumatically-actuated valve, the pressure-release safety assembly may further include a safety-valve pneumatic compressor.

The hydrostatic pressure testing system may include a video surveillance assembly including one or more video cameras, a video image display screen capable of displaying an image captured by each of the video cameras, and a video storage device for storing the images. The video display screen and video storage device may be housed in the control center. The video surveillance assembly may be capable of being controlled and monitored remotely.

The hydrostatic pressure testing system may further include a plurality of pressure sensors capable of detecting the fluid pressure in the internal section of the vessel during hydrostatic pressure testing operations. The computer display screen may be capable of displaying the detected fluid pressure. The computer storage device may be capable of storing the detected fluid pressure. The computer program may be capable of determining whether any gas is held in the internal section of the vessel based on the detected fluid pressure and a detected volume of test fluid displaced by the fill pump.

The hydrostatic pressure testing system may further include a plurality of temperature sensors capable of detecting an internal temperature in the internal section of the vessel and an external temperature surrounding an outer surface of the vessel during hydrostatic pressure testing operations. The computer display screen may be capable of displaying the detected temperatures. The computer storage device may be capable of storing the detected temperatures.

The hydrostatic pressure testing system may include a control module, a fluids module, a flow module, a pump module, and a power module. The control center may be disposed on the control module. The test fluid assembly may be disposed on the fluids module. The pressure-release safety assembly may be disposed on the flow module. The pump module may hold a fluid pumping assembly capable of increasing the fluid pressure within an internal section of the vessel during hydrostatic pressure testing operations. The power module may hold a power generation assembly for generating power to operate the hydrostatic pressure testing system.

In another embodiment, the hydrostatic pressure testing system may include a command module, a hydrostatic-pressure seal assembly, and a secondary module operatively associated with the command module. The command module may include a control center for operating the hydrostatic pressure testing system, a test fluid assembly, a power generation assembly, a fluid pumping assembly, and a test fluid evacuation assembly. The control center may include a computer control panel, a computer display screen, a computer storage device, and a computer program. The computer program may function to monitor, record, and control the pressure testing system during hydrostatic pressure testing operations. The test fluid assembly may include a fill conduit capable of providing a test fluid to an inlet section of a pipe to be tested in response to a command generated by the computer program. The power generation assembly may be capable of generating power to operate the pressure testing system. The fluid pumping assembly may be capable of increasing the fluid pressure in an internal section of the pipe during the hydrostatic testing operations. The test fluid evacuation assembly may be capable of evacuating the test fluid from the internal section of the pipe after the hydrostatic pressure testing operations.

The hydrostatic-pressure seal assembly may be capable of sealing the pipe so that a predetermined hydrostatic pressure may be applied to the internal section of the pipe during the hydrostatic pressure testing operations. The hydrostatic-pressure seal assembly may be controlled by the computer program.

The secondary module may include a pressure-release safety assembly including a vent conduit capable of providing a fluid communication between an outlet section of the pipe and a safety valve. The safety valve may be in fluid communication with a bleed tank for storing an outlet flow of the test fluid from the pipe. The safety valve may be capable of being actuated to relieve a fluid pressure in the internal section of the pipe during the hydrostatic pressure testing operations in response to a selective condition of the pressure testing system. The power generation assembly may include a generator.

The test fluid assembly may also include a test fluid tank for storing the test fluid and a fill pump in fluid communication with the test fluid tank. The fill pump may be capable of pumping the test fluid from the test fluid tank through the fill conduit to the inlet section of the pipe. The test fluid assembly may further include a filter in fluid communication with the test fluid tank. The filter may be capable of filtering the test fluid to remove impurities.

The hydrostatic-pressure seal assembly may include a pair of seal means. The seal means may each include an internal pipe locking means or an external pipe locking means to secure the seal means to the pipe. Each of the seal means may be a mechanical seal, a pneumatically-actuated seal, or a hydraulically-actuated seal.

If the pipe is open-ended, the inlet and outlet sections of the pipe are inlet and outlet ends. In this embodiment, each seal means may be a hydraulically-actuated pipe end plug. One of the pipe end plugs may seal the inlet end of the pipe and the other pipe end plug may seal the outlet end of the pipe.

If each seal means is a hydraulically-actuated seal, the pressure testing system may also include a hydraulic assembly capable of supplying a hydraulic fluid to actuate the hydraulically-actuated seal. The hydraulic assembly may include a hydraulic fluid reservoir, a hydraulic fluid pump in fluid communication with the hydraulic fluid reservoir, and a hydraulic fluid conduit providing fluid communication between the hydraulic fluid pump and the hydraulically-actuated seals to actuate the seals.

The fluid pumping assembly may include two or more pumps in fluid communication with the internal section of the pipe. The test fluid evacuation assembly may include an evacuation pump in fluid communication with the internal section of the pipe. The evacuation pump may be capable of pumping test fluid remaining in the internal section of the pipe after hydrostatic pressure testing operations. The safety valve may be a pneumatically-actuated valve, and the pressure-release safety assembly may also include a pneumatic compressor.

The hydrostatic pressure testing system may include a video surveillance assembly including one or more video cameras, a video image display screen capable of displaying an image captured by each of the video cameras, and a video storage device for storing the images. The video display screen and video storage device may be housed in the control center.

The hydrostatic pressure testing system may further include a plurality of pressure sensors capable of detecting the fluid pressure in the internal section of the pipe during hydrostatic pressure testing operations. The computer display screen may be capable of displaying the detected fluid pressure. The computer storage device may be capable of storing the detected fluid pressure. The computer program may be capable of determining whether any gas is held in the internal section of the pipe based on the detected fluid pressure and a detected volume of the test fluid pumped by the fill pump.

The hydrostatic pressure testing system may further include a plurality of temperature sensors capable of detecting an internal temperature in the internal section of the pipe and an external temperature surrounding an outer surface of the pipe during hydrostatic pressure testing operations. The computer display screen may be capable of displaying the detected temperatures. The computer storage device may be capable of storing the detected temperatures.

The command module and the secondary module may each be self-contained and adapted for mobility. The system may be capable of conducting simultaneous hydrostatic pressure testing operations on a plurality of pipes. The test fluid assembly may include one or more additional fill conduits. Each fill conduit may be capable of providing the test fluid to an inlet section of one of the pipes. The pressure-release safety assembly may include one or more additional vent conduits and one or more additional safety valves. Each vent conduit may be capable of providing a fluid communication between the outlet section of one of the pipes and one of the safety valves.

The selective condition may be a failure of the power generating assembly, a detection of a leak in the hydrostatic-pressure seal assembly, a detection of a movement of the hydrostatic-pressure seal assembly and an activation of one of a plurality of manual override switches provided on the pressure testing system. One or more manual override switches may be located at an external location on the command module. One or more manual override switches may be located within the control center. One or more manual override switches may be located at an external location on the secondary module.

A method of hydrostatic pressure testing may include providing a hydrostatic pressure testing system. The pressure testing system may include a command module having a control center for operating the system, a test fluid assembly, a power generation assembly capable of generating power to operate the pressure testing system, a fluid pumping assembly, a test fluid evacuation assembly, and a secondary module operatively associated with the command module. The control center may include a computer control panel, a computer display screen, a computer storage device, and a computer program. The computer program may monitor, record, and control the system during hydrostatic pressure testing operations. The test fluid assembly may include a fill conduit capable of providing a test fluid to an inlet section of a vessel to be tested in response to a command generated by the computer program. The fluid pumping assembly may be capable of increasing the fluid pressure in an internal section of the vessel during the hydrostatic pressure testing operations. The test fluid evacuation assembly may be capable of evacuating the test fluid from the internal section to the vessel after hydrostatic pressure testing operations. The secondary module may include a pressure-release safety assembly having a vent conduit capable of providing a fluid communication between an outlet section of the vessel and a safety valve. The safety valve may be in fluid communication with a bleed tank for storing an outlet flow of the test fluid from the vessel. The safety valve may be capable of being actuated to relieve a fluid pressure in the internal section of the vessel during the hydrostatic pressure testing operations in response to a selective condition of the pressure testing system.

The method of hydrostatic pressure testing may also include filling the internal section of the vessel with the test fluid. A predetermined fluid pressure may be applied to the internal section of the vessel. The fluid pressure in the internal section of the vessel may be monitored, recorded, and evaluated to determine if the fluid pressure has been maintained in a specified range for a prescribed time period.

The vessel of the hydrostatic pressure testing system may be a pipe. The hydrostatic pressure testing system may further include a hydrostatic-pressure seal assembly. The hydrostatic-pressure seal assembly may be capable of sealing the pipe so that a predetermined hydrostatic pressure may be applied to the internal section of the pipe during the hydrostatic pressure testing operations. The hydrostatic-pressure seal assembly may be controlled by the computer program. The method of hydrostatic pressure testing may also include sealing the vessel by operatively connecting the hydrostatic seal assembly to the vessel.

The hydrostatic pressure testing system may also include a pressure sensor in the internal section of the vessel which is operatively controlled by the computer program. The pressure sensor may detect the fluid pressure in the internal section of the vessel. The system may also include an internal temperature sensor in an internal section of the vessel which is operatively controlled by the computer program. The internal temperature sensor may detect an internal temperature in the internal section of the vessel. The system may also include an external temperature sensor outside of the vessel that is operatively controlled by the computer program. The external temperature sensor may detect an external temperature at an outer surface of the vessel. The method may also include monitoring, recording, and evaluating the internal and external temperatures to determine if the temperatures influenced the fluid pressure monitored in the internal section of the vessel.

The method may also include using the computer program to determine whether any gas remains in the internal section of the vessel based on the detected fluid pressure and a detected volume of test fluid pumped by the fluid pumping assembly.

The method may further include evacuating the test fluid remaining in the internal section of the vessel after hydrostatic pressure testing operations and removing the hydrostatic-pressure assembly from the vessel. The method may be simultaneously performed on a plurality of vessels.

The hydrostatic pressure testing system of the present invention is self-contained. The system is also computerized. Features of the system include:
(1) capable of hydro-testing 2" through 30" diameter open-ended pipe;
(2) 2" through 12" to 5,000 psi and 14" through 30" to 3,000 psi;
(3) hydraulically-actuated external pipe plugs are installed and removed in minutes;
(4) capable of testing three pipes of the same or different size simultaneously;
(5) automated system with advanced and unique safety systems;
(6) economical, safe, fast and accurate hydro-testing;
(7) test pressure range capability covers all pipe grades and weights as well as alloys, stainless and other exotic materials;
(8) safe to use with all internal pipe coatings;
(9) highly mobile, self-contained system;
(10) web enabled remote monitoring of hydrostatic pressure testing operations with the video surveillance system; and
(11) web enabled remote monitoring of the pressure and temperature with the computer systems.

DETAILED DESCRIPTION OF THE PREFERRED EMBODIMENTS

The drawings illustrate an embodiment of the present invention for hydrostatic pressure testing of pipe. The hydrostatic pressure testing system is not limited to this embodiment. The pressure testing system may be used for hydrostatic pressure testing of any vessel, which may include pipe or a pressure vessel designed to retain liquid or gas.

Figure 1:
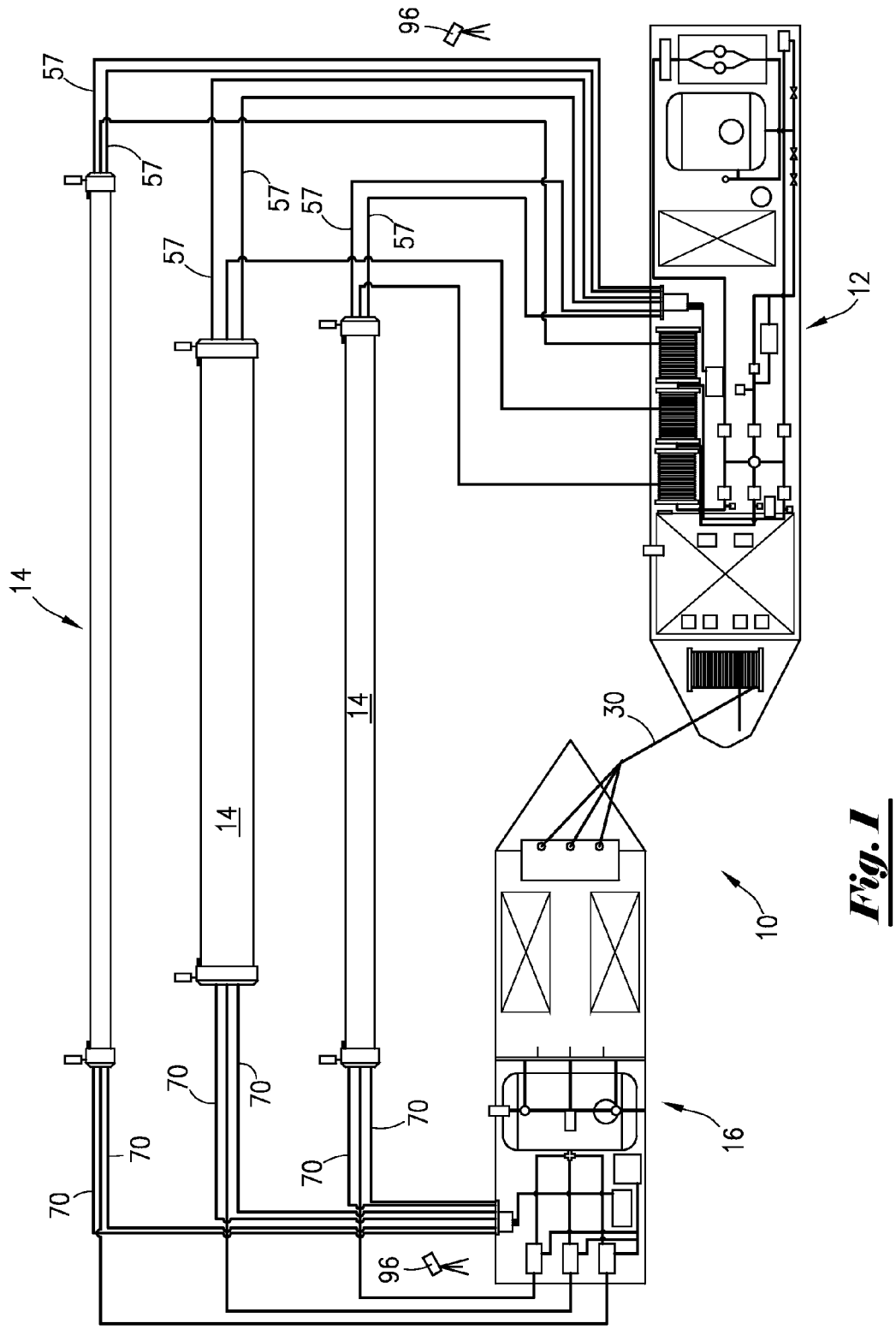
FIG. 1 is a schematic illustration of the hydrostatic pressure testing system of the present invention for testing pipe.
Figure 2:
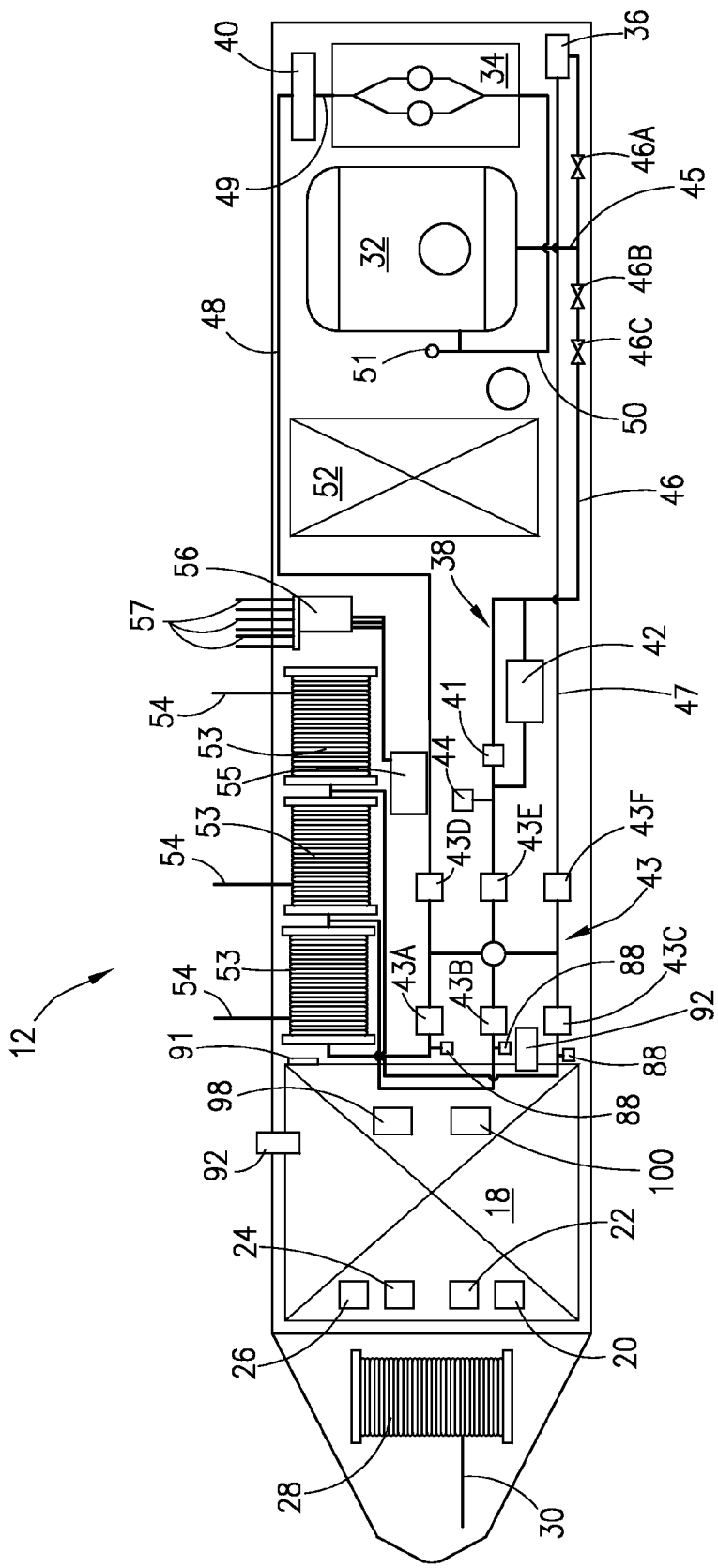
FIG. 2 is a schematic illustration of the command unit of the hydrostatic pressure testing system for testing pipe.

With reference to FIG. 1, hydrostatic pipe testing system 10 may include command module 12, one or more sections of pipe 14, and a secondary module 16. As shown in FIG. 2, command module 12 may include control center 18 for automatically operating hydrostatic testing of pipe 14. Control center 18 may include computer control panel 20, computer display screen 22, computer storage device 24, and computer program 26. Command module 12 may also include umbilical reel 28 for storage of umbilical cable 30, which electronically connects command module 12 to secondary module 16 (shown in FIG. 1). Command module 12 may include test fluid tank 32 for storing a test fluid for use in hydrostatic pipe testing operations. The test fluid may be a nearly incompressible liquid such as water. The test fluid may be a mixture of water and one or more additives. Alternatively, test fluid tank 32 may be included on a separate module from command module 12 (e.g., a fluids module). In this embodiment, the module containing test fluid tank 32 may not need to be transported to a job location and an existing fluid source (e.g., a water source) may be used for the test fluid. In other words, use of the module containing test fluid tank 32 may be an optional. Filter 34 may be included on command module 12 for removing impurities from the test fluid before the test fluid is used in hydrostatic pipe testing operations.

Referring still to FIG. 2, command module 12 may include fill pump 36, fluid pumping assembly 38, and evacuation pump 40. Fluid pumping assembly 38 may include first pump 41 and second pump 42. First pump 41 may be a Hydroplex pump. Second pump 42 may be a Haskell pneumatic pump, which may be pneumatically-actuated by a pneumatic compressor positioned on command module 12. Manifold 43 may direct fluid flow by selectively actuating one or more valves. Manifold 43 may include system A valve 43A, system B valve 43B, system C valve 43C, evacuation pump valve 43D, pressure pump valve 43E, and fill pump valve 43F. Manifold pressure relief valve 44 may selectively relieve pressure in the manifold lines after valves 43A, 43B, and 43C have been closed.

Tank conduit 45 may fluidly connect test fluid tank 32 and first conduit 46. First conduit 46 may be connected to fill pump 36, first pump 41, and second pump 42. Valve 46A may be attached to first conduit 46 between the connection to tank conduit 45 and fill pump 36. Valves 46B and 46C may be attached to first conduit 46 between the connection to tank conduit 45 and first and second pump 41, 42. Second conduit 47 may fluidly connect fill pump 36 and fill pump valve 43F. Third conduit 48 may fluidly connect evacuation pump valve 43D and evacuation pump 40. Fourth conduit 49 may fluidly connect evacuation pump 40 and filter 34. Fifth conduit 50 may fluidly connect filter 34 and test fluid tank 32. Fifth conduit 50 may include a hose connection point 51.

Power generation assembly 52 on command module 12 may provide power for control center 18, fill pump 36, fluid pumping assembly 38, evacuation pump 40 and any other components requiring electrical power. Power generation assembly 52 may include a power generator. Alternatively, power generation assembly 52 may be included on a separate module from command module 12 (e.g., a power module). In this alternate embodiment, the module containing power generation assembly 52 may not be transported to a job location, and an existing power source at the job location may be utilized instead. In other words, use of the module containing power generation assembly 52 may be optional. Command module 12 may also include conduit reels 53 for storage of fill conduits 54, through which the test fluid will be supplied to pipes 14. Command module 12 may contain a hydraulic assembly including hydraulic fluid reservoir 55, hydraulic fluid pump 56, and hydraulic fluid conduits 57. Command module 12 may be portable. Command module 12 may include a forty foot (40') trailer for mobility.

Figure 3:
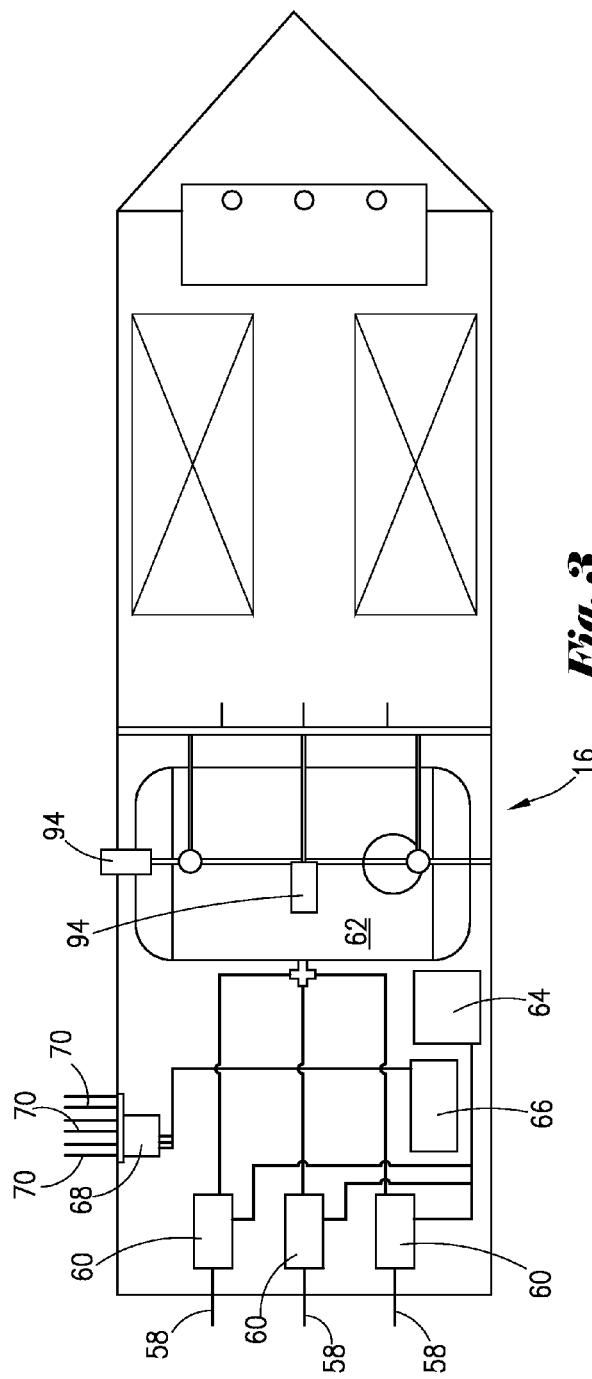
FIG. 3 is a schematic illustration of the secondary module of the hydrostatic pressure testing system for testing pipe.

As shown in FIG. 3, secondary module 16 may include vent conduits 58 fluidly connected to safety valves 60 and bleed tank 62. Safety valves 60 may be pneumatically-actuated with pneumatic compressor 64. Safety valves 60 and bleed tank 62 may act as a pressure release safety assembly. Secondary module 16 may also include a hydraulic assembly including hydraulic fluid reservoir 66, hydraulic fluid pump 68, and hydraulic fluid conduits 70. Secondary module 16 may be portable. Secondary module 16 may include a twenty foot (20') trailer for mobility.

Figure 4:
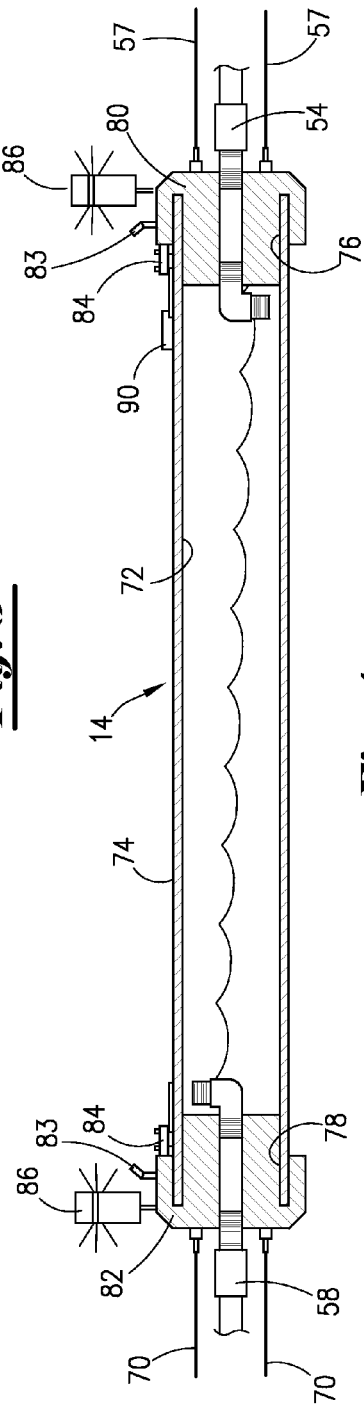
FIG. 4 is a cross-sectional view of a pipe during hydrostatic testing operations.

Referring now to FIG. 4, pipe 14 may have an internal section 72, an external surface 74, an inlet section 76, and an outlet section 78. System 10 may also include a hydrostatic-pressure seal assembly, which may include inlet seal 80 operatively connected to inlet section 76 of pipe 14 and outlet seal 82 operatively connected to outlet section 78 of pipe 14. Inlet seal 80 may be fluidly connected to fill conduit 54 such that test fluid tank 32 is in fluid communication with internal section 72 of pipe 14 through fill conduit 54 and inlet seal 80. Outlet seal 82 may be fluidly connected to vent conduit 58 such that internal section 72 of pipe 14 is in fluid communication with bleed tank 62 through outlet seal 82, vent conduit 58, and one of safety valves 60. Inlet seal 80 and outlet seal 82 may each include an internal locking means or an external locking means capable of securing inlet seal 80 and outlet seal 82 on pipe 14. Inlet seal 80 and outlet seal 82 may be mechanically operated, pneumatically actuated, or hydraulically actuated. Inlet seal 80 and outlet seal 82 may each contain lifting attachment 83. Lifting attachment 83 may be a lifting eye.

Pipe 14 may be an open-ended section of pipe such that inlet section 76 is an inlet end and outlet section 78 is an outlet end as shown in FIG. 4. Where pipe 14 is an open-ended section of pipe, inlet seal 80 and outlet seal 82 may be hydraulically-actuated pipe end plugs such as those available from STATS (UK) Limited under the trade name E-PEP. These pipe end plugs may be provided for fitting sections of pipe 14 having sizes from three inches (3") to thirty-six inches (36"). Sizes three inches (3") to fourteen inches (14") may be rated at 5,000 psi maximum working pressure. Sizes sixteen inches (16") to thirty-six inches (36") may be rated at 3,000 psi maximum working pressure. Hydraulic fluid conduits 57 may be fluidly connected to inlet seal 80 for hydraulic actuation of inlet seal 80 with hydraulic fluid pumped from hydraulic fluid reservoir 55 by hydraulic fluid pump 56 on command module 12. Hydraulic fluid conduits 70 may be fluidly connected to outlet seal 82 for hydraulic actuation of outlet seal 82 with hydraulic fluid pumped from hydraulic fluid reservoir 66 by hydraulic fluid pump 68 on secondary module 16.

Referring still to FIG. 4, system 10 may include proximity sensors 84 for monitoring the position of inlet seal 80 on inlet section 76 of pipe 14 and for monitoring the position of outlet seal 82 on outlet section 78 of pipe 14. System 10 may also include flashing safety lights 86, pressure sensors 88 (shown in FIG. 2) capable of measuring the fluid pressure in internal section 72 of pipe 14, and temperature sensors 90 capable of measuring the environmental temperature surrounding external surface 74 of pipe 14. System 10 may also include temperature sensors 90 capable of measuring the temperature in internal section 72 of pipe 14. System 10 may further include ambient temperature sensor 91, which may be capable of measuring the temperature of the surroundings of control module 12. Ambient temperature sensor 91 may be mounted on control center 18 as shown in FIG. 2. Pressure sensors 88 may be capable of testing to a maximum pressure of 5,000 psi.

Computer program 26 may be capable of performing an "air inclusion" check by monitoring the volume of test fluid displaced by first pump 41 and comparing the rise in the pressure detected by pressure sensor 88 (for a given volume of internal section 72 of pipe 14 being tested). The displaced volume of test fluid may be measured by a sensor that measures the number of rotations of first pump 41. If the pressure rise is lower than a set value, the "air inclusion" check yields a positive result indicated that air remains in internal section 72 of pipe 14. Continued pumping under these conditions will compress the remaining air. Any failure of pipe 14 having compressed air has the potential to cause greater damage than if pipe 14 contained no air because compressed air will expand as it is released from pipe 14.

Computer program 26 may also be capable of generating charts or graphs of pressure values over time and charts or graphs of pressure and temperature values over time. These charts or graphs may be displayed by computer display screen 22, stored by computer storage device 24, or printed. These charts or graphs will provide a user with information on the hydrostatic pressure testing operation. For example, if the external temperature drops during testing operations, the user will know to expect a corresponding pressure drop in pipe 14 and the user will know that this pressure drop was not caused by a failure or defect in pipe 14.

System 10 may include more than one pipe 14 as shown in FIG. 1, and may be capable of performing hydrostatic testing operations on pipes 14 having the same or different sizes and lengths at the same or different hydrostatic testing pressures.

System 10 may further include a video surveillance assembly including video cameras 92 mounted on command module 12 as shown in FIG. 2, video cameras 94 mounted on secondary module 16 as shown in FIG. 3, and video cameras 96 mounted on tripods positioned near system 10 as shown in FIG. 1. Video cameras 92, 94, 96 may capture video images of system 10 before, during, and after hydrostatic pipe testing. The video images may be displayed on video image display screen 98 housed in control center 18 as shown in FIG. 2. The video images may be stored on video storage device 100 housed in control center 18 as shown in FIG. 2.

System 10 may also include various types of safety equipment. The safety equipment may include an electrical ground fault protection unit, manual E-stops on command module 12 and secondary module 16, fire extinguishers, flashing safety lights 86 on each end of pipe 14 being pressurized or under test pressure, continuous radio communication between an operator in control center 18 and technicians, continuous monitoring of the hydraulic pressure in hydraulic fluid conduits 57, 70, proximity sensors 84 that will detect movement of inlet seal 80 and outlet seal 82.

The safety equipment may also include an electronic monitoring system for power generation assembly 52 which disables the power generator when an unacceptable irregularity is detected. The pressure release safety assembly on secondary module 16, including safety valves 60 and bleed tank 62, acts as further safety equipment. Each safety valve 60 opens and quickly relieves pressure in the system of the pipe 14 to which the safety valve 60 is fluidly connected upon the occurrence of a selective condition. Selective conditions may include: power failures; detected leaks in hydraulic assemblies on command module 12 and secondary module 14 or in hydraulic fluid conduits 57, 70; movement of inlet seal 80 or outlet seal 82 detected by proximity sensors 84; and activation of an E-stop.

In an alternate embodiment, system 10 may include the above-described components on any number of separate modules. This embodiment may allow transportation of only the modules necessary for a particular job location (e.g., an offshore rig or platform). For example, system 10 may include a power module, a fluids module, a pump module, a flow module, and a control module. The power module may contain power generation assembly 52. The fluids module may contain test fluid tank 32, bleed tank 62, hydraulic fluid reservoirs 55 and 66, and hydraulic fluid pumps 66 and 68. The pump module may contain all other pumps (e.g., fill pump 36, fluid pumping assembly 38, and evacuation pump 40). The flow module may contain manifold 43, conduit reels 53, and safety valves 60. If existing equipment at a job location may be used in place of any of the components described above, the module containing those components need not be transported to the job location. For example, if an existing power source may be used at a particular job location, the power module need not be transported there with the other modules.

Hydrostatic pipe testing may begin with positioning command module 12 toward inlet section 76 of pipe 14 to be tested such that the closest pipe 14 to be tested is at least thirty feet (30') away from command module 12. Secondary module 16 may be unmanned and may be positioned near outlet section 78 of pipe 14 to be tested. Secondary module 16 may be placed much closer to pipe 14 to be tested than command module 12.

A method of using system 10 may include the steps of: (1) preparing system 10, (2) checking that system 10 is functioning properly, (3) preparing pipe 14, (4) preparing inlet seal 80 and outlet seal 82, (5) installing inlet seal 80 and outlet seal 82, (6) hydrostatic pipe testing, (7) removing pipe end plugs 70, and (8) disabling system 10.

Preparing system 10 in step (1) may include positioning and disabling the mobility of command module 12 (e.g., by chocking wheels and extending front and rear support legs). A ground rod may be driven into the ground and a grounding lead may be connected from command module 12 to the ground rod. All necessary ladders may be placed in the appropriate positions on command module 12 and secondary module 16. Radios may be distributed to technicians for communication with an operator in control center 18. Computer control panel 20, computer display screen 22, computer storage device 24, computer program 26, and any other components of the control system in control center 18 may be activated. Secondary module 16 may be positioned such that the tongs of command module 12 and secondary module 16 are facing one another. The mobility of secondary module 16 may also be disabled. The fluid levels in the power generator of power generation assembly 52 may be checked. After starting the power generator, the operator may verify that computer display screen 22 in control center 18 indicates no problem with the power generator.

Preparing system 10 in step (1) may also include unlocking umbilical reel 28 on command module 12 and unreeling an amount of umbilical cable 30 in order to connect umbilical cable 30 to secondary module 16. Umbilical cable 30 may be connected to secondary module 16 and plugged into receptacles on command module 12. The operator may provide power to umbilical cable 30 and check that it powers up properly. Cable bridge segments may be attached to umbilical cable 30 for protection. Vehicle crossing areas may be provided. The oil level of pneumatic compressor 64 on secondary module 16 may be checked. Video cameras 92, 94, 96 may be installed and positioned on command module 12, secondary module 16, and on tripods near system 10.

Preparation of system 10 may further include filling test fluid tank 32 on command module 12 with test fluid and adding any additives desired. Test fluid tank 32 may hold as much as 1,500 gallons of test fluid. Test fluid tank 32 may be filled by connecting test fluid tank 32 to a reservoir for gravity filling. Alternatively, test fluid tank 32 may be connected to a system with a transfer pump. In yet another alternative, one of hoses of system 10 and any necessary extensions may be connected to a reservoir and evacuation pump 40 may be used to transfer the test fluid into test fluid tank 32. The operator should understand the nature and disposal requirements of all additives used and should have MSDS available for all additives used.

Details of the pipe(s) to be tested may be obtained from the pipe owner or other person owning or controlling the pipe. These details may include size, wall thickness (schedule), length, material, test pressure, identification number of the pipe, and the exact locations.

Checking the function of system 10 in step (2) may include providing power to command module 12 and secondary module 16, checking the computerized control system in control center 18, checking the hydraulic assembly on command module 12 and the hydraulic assembly on secondary module 16, checking the pneumatic system on command module 12 and pneumatic compressor 64 on secondary module 16, and checking the video surveillance assembly.

Checking the computerized control system in control center 18 may include verifying that the computerized control system has properly booted up and that the uninterruptible power supply is charging. The proper operation of computer display screen 22 and the touch screen may be verified. It may also be verified that no computerized control system problems are indicated.

Checking the hydraulic assemblies on command module 12 and secondary module 16 may include connecting hydraulic fluid conduits 57, 70 to the control valve block on command and secondary modules 12, 16 by connecting matching colors on each of hydraulic fluid conduits 57, 70 with each block. Matching colors may be yellow for a first pipe system, blue for a second pipe system, and orange for a third pipe system. The level of hydraulic fluid in hydraulic fluid reservoirs 55, 66 on command and secondary modules 12, 16 may be checked and hydraulic fluid may be added if necessary. Hydraulic fluid pumps 56, 68 on command and secondary modules 12, 16 may be activated. Main pressure relief valves on each hydraulic assembly may be set to 3,000 psi by "deadheading" one of hydraulic fluid conduits 57, 70 and using a pressure gauge on each hydraulic assembly while operating the corresponding valve manually. Pressure may be applied in each of the hydraulic fluid conduits 57, 70. The operator may confirm that the pressure reading of the transducer corresponds exactly with the main pressure relief valve setting in order to verify the accuracy of each pressure transducer. The manual override on the hydraulic valve blocks of both units may be locked out.

The functioning and pressure maintenance of the pneumatic compressor on command module 12 and pneumatic compressor 64 on secondary module 16 may be checked. Both compressors should maintain the required minimum air pressure. The minimum pressure may be 80 psi on command module 12 and 110 psi on secondary module 16. The air pressure on secondary module 16 should never exceed 120 psi.

Checking the video surveillance assembly may include installing and positioning all video cameras 92, 94, 96 in the appropriate holders and connecting the appropriate lines. Video cameras 92, 94, 96 may be powered. The function of each of the video cameras 92, 94, 96 may be checked. Each of the video cameras 92, 94, 96 may be directed in the desired direction. The operator may verify that video image display screen 98 and video storage device 100 operate properly in control center 18. The tripod-mounted video cameras 96 may be positioned to allow observation of inlet and outlet sections 76, 78 of pipe 14 with inlet and outlet seals 80, 82 installed.

Checking the function of system 10 in step (2) may further include checking the main test system. A test hose of system 10 having one of the matching colors may be connected to the inlet side of filter 34 on command module 12 using a cam lock adapter. Control valves may be opened and closed to allow fluid flow through the conduits connected to filter 34. Fill pump 36 may be started and run at a slow rate. While running fill pump 36, the operator may verify the proper function of fill pump 36, a flow meter, and a volume gauge on test fluid tank 32. The operator may also verify that filter 34 is open and ready for use (by measuring the pressure drop across each of the filter pods) and that the variable frequency drive controller is working (by varying the motor speed). Fill pump 36 may be stopped, and the test hose may be disconnected from filter 34.

Checking the main test system may also include connecting the test hose to a drain outlet of test fluid tank 32 using the same cam lock adapter and opening a corresponding control valve. Control valves may be opened and closed to allow evacuation fluid flow through the conduits connected to the test fluid tank 32. Evacuation pump 40 may be started and run at a slow rate. While evacuation pump 40 is running, the operator may verify that evacuation pump 40 is properly primed and moving fluid as designed, and that the variable speed is working (VFD controller). Evacuation pump 40 may be stopped, and the test hose may be disconnected from the drain outlet of test fluid tank 32. The test hose may be connected to a test hose of secondary module 16 by means of a connector in order to ensure that the proper pipe systems are connected together using the matching colors. The closing and opening function of each of safety valves 60 on secondary module 16 may be checked.

Checking the main test system may further include opening and closing control valves to allow fill up fluid flow through the conduits connected to secondary module 16. Fill pump 36 may be started and conduits may be filled in order to observe the overflow into bleed tank 62 on secondary module 16. Safety valves 60 may be closed in order to test that the relief valve in the fill system opens properly at a threshold pressure. This threshold pressure may be set to 50 psi. Fill pump 36 may be stopped and control valves may be switched such that fill conduits 54 and vent conduits 58 may be pressurized. First pump 41 of fluid pumping assembly 38 may be started and pressured. First pump 41 may be a Hydroplex pump, and it may be pressured to 150 psi. Safety valve 60 on secondary module 16 may be opened briefly to observe pressure relief.

Checking the main test system may further include closing safety valve 60 to allow the pressure to build to 250 psi. The system may be held at that pressure to verify that the dead weight pressure gauge and the reading from the appropriate pressure transducer correspond, that the rpm counter on the shaft of first pump 41 functions properly to allow a determination of the displaced volume, that the "air inclusion" algorithm functions properly when building pressure in system 10, that the data logging portion of computer program 26 is functioning and recording data properly, that system 10 holds pressure for five minutes with a maximum pressure drop of ten (10) psi, and that the temperature sensors 90, 91 are functioning properly. With the pressure in system 10 at 250 psi, second pump 42 of fluid pumping assembly 38 may be started and pressured to 300 psi to verify proper operation of second pump 42. Second pump 42 may be a Haskell pneumatic pump. The pneumatic system on command module 12 may operate the Haskell pneumatic pump. The pressure may be bled to atmospheric pressure by opening safety valve 60 and a system bleed-off valve.

Preparing pipe 14 in step (3) may involve clearly identifying pipe 14 and determining that pipe 14 is the size, schedule, and number the pipe owner or other similar person indicated. The operator may look through pipe 14 to verify that there are no visible obstructions or foreign material accumulations in pipe 14. For open-ended pipe, it should be verified that a length of at least 8" of pipe 14 on each outer end (inlet and outlet sections 76, 78) is free of corrosion, irregularities, burrs and seems on the inside and the outside. Grinding, sanding, or other procedures may be required for proper installation of hydrostatic-pressure seal assembly on inlet and outlet sections 76, 78 of pipe 14. The entirety of pipe 14 should be properly supported and secured so as to not allow shifting, rotation, or any other movement when internal section 72 of pipe 14 is filled with test fluid. Plug lifting and transportation equipment may be provided for installation of the hydrostatic-pressure seal assembly. An unobstructed and safe passage to pipe 14 should be allowed for plug lifting and transportation equipment. Any irregularity or unsafe condition should be reported and resolved before installation of the hydrostatic-pressure seal assembly on pipe 14.

Preparation of inlet and outlet seals 80, 82 in step (4) may include selecting the proper size inlet seal 80 and outlet seal 82 for pipe 14. The proper locking means (internal or external) may be selected based on the shape of inlet and outlet sections 76, 78 of pipe 14. If pipe 14 is open-ended and inlet and outlet seals 80, 82 are pipe end plugs, the proper seal assembly should be installed in each pipe end plug based on the wall thickness (schedule) of pipe 14. All conduits should be clean and in working order. Inlet section 76 and outlet section 78 of pipe 14 to be tested may be identified, and the pipe end plugs may be arranged accordingly. If the pipe end plugs contain tube extensions, the tube extensions on the pipe end plugs may be properly positioned. Proximity sensors 84, temperature sensors 90 and 91, and safety lights 86 may be prepared for inlet and outlet section 76, 78 of pipe 14. One proximity sensor 84, one temperature sensor 90, and one safety light 86 may be attached to inlet section 76 of pipe 14. One proximity sensor 84 and one safety light 86 may be attached to outlet section 78 of pipe 14. Lifting attachment 83 may be inspected.

Preparation of inlet and outlet seals 80, 82 may also include unlocking conduit reels 53. Fill conduits 54, vent conduits 58, and cables may be laid out from command module 12 and secondary module 16 to inlet and outlet sections 76, 78 of pipe(s) 14 to be tested. The color coding of fill conduits 54, vent conduits 58, and cables should correspond with the pipe system to be tested. Cable bridges may be used to protect fill conduits 54, vent conduits 58, and cables to prevent tripping hazards and to provide clearly marked vehicle crossing areas. The slips and seal areas of each of the pipe end plugs may be inspected before lifting the pipe end plugs. If inlet and outlet sections 76, 78 of pipe 14 to be tested are at different levels, the section at the higher elevation may be used as outlet section 78.

Installation of inlet seal 80 and outlet seal 82 in step (5) may include checking and adjusting the pressure settings of the relief valves on hydraulic fluid pumps 56, 68 according to the inlet and outlet seals 80, 82 to be installed. Table 1 below sets forth recommended hydraulic pressures for setting inlet and outlet seals 80, 82 on pipe 14 having pipe schedules 40 and up, for thinner wall pipes. If inlet and outlet seals 80, 82 are pipe end plugs, the lifting equipment may be attached to lifting attachment 83 of each pipe end plug, and each may be transported to the required location. It may be again checked that the proper pipe system is attached by matching colors. It may again be checked that the correct hydraulic fluid conduits 57, 70 are attached by matching colors. The desired equipment may be magnetically attached to the outer body of each pipe end plug.

TABLE 1

PLUG HYDRAULIC PRESSURE CHART

| Pipe size | Hydrostatic test pressure | Hydraulic set pressure |
|---|---|---|
| 3"-14" | 5,000 psi maximum | 3,000-4,000 psi |
| 16"-36" | 3,000 psi maximum | 2,500-3,000 psi |

The installation of pipe end plugs may also include making a chalk mark on external surface 74 of pipe 14 indicating where the outer edge of the pipe end plug will fall when properly installed. Table 2 sets forth the minimum straight lengths of pipe 14 required to set pipe end plugs, as well as the maximum add-on if so required. The pipe end plugs may be lifted and slid over the open inlet section 76 and open outlet section 78. The pipe end plugs may be set when the outer edge of the pipe end plug is aligned with the chalk mark on external surface 74 of pipe 14. It should be confirmed that the pipe end plugs are set by attempting to slide the pipe end plugs off the pipe. The lifting attachment may be removed, and the magnetic holder may be positioned with proximity sensor 84 up against the face of the pipe end plug. The magnetic base of safety light 86 may be positioned on pipe 14. The operator should confirm that proximity sensor 84 is activated and the hydraulic set pressure is within the prescribed range before moving on to the next operation.

TABLE 2

PLUG DEPTH CHART

| Pipe Size | Plug Depth |
|---|---|
| 3" | 3" |
| 4" | 4" |
| 6" | 6" |
| 8" | 6" |
| 10" | 6" |
| 12" | 6.5" |
| 14" | 7" |
| 16" | 7" |
| 18" | 7" |
| 20" | 7" |
| 24" | 7" |
| 30" | 8" |
| 36" | 8" |

The installation of the pipe end plugs may further include taking appropriate actions if proximity sensors 84 or hydraulic set pressures are incorrect. Proximity sensor 84 or even the entire pipe end plug may be changed out until proper installation is achieved. It should be confirmed that the pipe end plug is properly installed, and specified which pipe system and whether inlet section 76 or outlet section 78. Proper setup may be confirmed through video images captured by video cameras 92, 94, 96.

Hydrostatic pipe testing in step (6) above may include starting the data logging and recording computer program 26. Program 26 may include data fields for entry of information about each of the pipe systems to be tested simultaneously. Required information may include company name, company location, project name, pipe size, pipe schedule, and pipe length for each pipe system. Program 26 may automatically calculate the internal volume of pipe 14 based on data input. Other information that may be required by program 26 includes the identification code or number of the pipe 14 to be tested, the hydrostatic test pressure required, the pressure variance tolerance allowed, and the required holding time. Program 26 may include a default value for pressure variance tolerance and holding time if no value is entered by a user. The default value for pressure variance tolerance may be plus or minus 1% of nominal. The default value for holding time may be thirty (30) minutes. Further information such as pipe body material or end descriptions may be required by program 26. Program 26 may include a data entry field for notes.

The video surveillance assembly and various other indicators of system 10 may be used to determine whether each pipe system is ready to be filled with test fluid. These indicators may display results of the determination of whether the pressure in each hydraulic fluid conduit 57, 70 is in the required range, whether proximity sensors 84 and temperature sensors 90, 91 are activated, and whether the pipe end plugs are properly installed on pipe 14. The operator may activate on computer control panel 20 an automatic testing sequence for the appropriate pipe system.

The automatic testing sequence may include opening and closing the appropriate control valves using electronic actuators to fill the selected pipe system with test fluid. For example, in order to fill pipe 14 of system A with test fluid, valve 46A may be open and valve 46B may be closed. Additionally, system A valve 43A and fill pump valve 43E may be open while all remaining valves 43B, 43C, 43D, 43F of manifold 43 may be closed. This configuration will direct test fluid from test fluid tank 32, through tank conduit 45, through first conduit 46, through fill pump 36, through second conduit 47, through fill pump valve 43F, through the conduits of manifold 43, through system A valve 43A, through fill conduit 54 of system A, and into internal section 72 of pipe 14. Air and excess test fluid may flow out of internal section 72 of pipe 14 through vent conduit 58, through safety valve 60, and into bleed tank 62.

Fill pump 36 may be started and its speed may be increased to achieve the desired flow rate for the size of pipe 14 in the selected pipe system. The displacement of test fluid may be measured using a flow meter. Pipe 14, pipe end plugs, and the surrounding areas may be observed on video image display screen 98 within control center 18. Fill pump 36 may be slowed when reaching 90-95% of the calculated internal volume of pipe 14. Fill pump 36 may be stopped when 105% of the calculated internal volume of test fluid is displaced.

After stopping fill pump 36, safety valve 60 may be closed and safety lights 86 may be activated. Also, the appropriate control valves may be opened and closed using electronic actuators for applying pressure in internal section 72 of pipe 14. For example, valve 46A may be closed and valve 46B may be opened. Additionally, fill pump valve 46F may be closed and pressure pump valve 43E may be opened. This configuration will direct test fluid from test fluid tank 32, through tank conduit 45, through first conduit 46, through first pump 41, through pressure pump valve 43E, through the conduits of manifold 43, through system A valve 43A, through fill conduit 54 of system A, and into internal section 72 of pipe 14. First pump 41 of fluid pumping assembly 38 may be started and an "air inclusion" check may be performed. The "air inclusion" check records the volume of test fluid displaced by first pump 41 and the corresponding pressure rise in the selected pipe system measured by pressure sensor 88. Digital dead weight readings may be recorded while pressuring up and the valves may be corresponded with the pressure transducer valves. Safety valve 60 may be briefly opened to vent additional air out.

If the "air inclusion" algorithm yields a positive result, the automatic testing sequence may include briefly opening safety valve 60 of the selected pipe system to release the air remaining in internal section 72 of pipe 14. After closing safety valve 60, the "air inclusion" check may be repeated until a negative result occurs.

The automatic testing sequence may also include increasing the pressure in the selected pipe system after the "air inclusion" algorithm yields a negative result. The pressure may be increased rapidly to about 75% of the required hydrostatic test pressure using first pump 41, and then the pressure may be increased at a slower rate. First pump 41 may be stopped at or below the required hydrostatic test pressure. Second pump 42 of fluid pumping assembly 38 may be started when the final indicated hydrostatic test pressure is more than 0.2% below the desired value or drops below this margin within five (5) minutes of initially achieving the hydrostatic test pressure. Alternatively, first pump 41 may be used for the entirety of the pressurization process. System 10 allows for pressure settling for five (5) minutes and will then bring the pressure in internal section 72 of pipe 14 to the desired hydrostatic test pressure, shut the system in and start monitoring the pressure within internal section 72 for the required holding time. For example, system A may be shut in by closing system A valve 43A. After shutting in system A by closing system A valve 43A, the pressure in the conduits of manifold 43 remain at the elevated test pressure. To relieve this high pressure in the conduits of manifold 43, manifold pressure relief valve 44 may be opened and test fluid may be routed back to test fluid tank 32. This will allow valves 43B-43F to be opened and closed as necessary for filling, pressurizing, or evacuating system B or system C. The internal pressure, internal temperature, and environmental temperature may be monitored and recorded.

The automatic testing sequence may further include maintaining the pressure in internal section 72 within the specified range. If the pressure drops below the specified range, the predetermined holding time will be maintained and pressures and temperatures will be recorded to make a determination at the end of the holding time whether any temperature fluctuations have influenced the pressure and whether the test is successful or not. If the pressure drops below the plus or minus 5% range, the test is aborted and considered unsuccessful. System 10 then opens safety valve 60 and vent valve to bleed off all pressure in the system after the test is complete. Safety lights 86 are then turned off.

Technicians and/or owner personnel may be allowed to be in the immediate vicinity of pipe 14 to be tested during filling and evacuation but should be at least 30 feet away from pipe 14 during pressurizing and holding of pressure. Pipe installation or removal on neighboring pipes may be performed during filling or evacuation but not during the pressurization and test cycle. The operator may be responsible for planning the sequences of operations and must ensure that no one is within thirty feet (30') of any pipe 14 which is pressurized. Exceptions to these requirements may only be allowed when the pipe owner or other similar person authorizes in writing based on a risk analysis. All exceptions may be documented on a preventative action report.

Upon completion of a hydrostatic pipe test, all test data may be secured and filed and may be transferred to the pipe owner or other similar person in the form of hard copies, on CD or DVD and/or by email or other forms of electronic file transfer, as the pipe owner or other similar person requires. Evacuation of the completed pipe may be performed by starting the evacuation cycle, which will adjust the control valve settings and engage evacuation pump 40 to enable evacuation. For example, in the evacuation cycle for system A, system A valve 43A and evacuation pump valve 43D may be opened. When evacuation pump 40 is started, this configuration will allow test fluid to flow from internal section 72 of pipe 14, through fill conduit 54 of system A, through system A valve 43A, through the conduits of manifold 43, through evacuation pump valve 43D, through third conduit 48, through evacuation pump 40, through fourth conduit 49, through filter 34, through fifth conduit 50, and into test fluid tank 32.

Removal of the pipe end plugs in step (7) may include containing any spilled test fluid in order to comply with any applicable disposal restrictions. The switch holder and safety light 86 may be removed from pipe 14 and both may be attached to the body of the pipe end plugs. The lifting equipment may be attached to the lifting attachments 83 of pipe end plugs for removal. The hydraulic assemblies on command and secondary modules 12, 16 may be disabled allowing the pipe end plugs to be slid off inlet and outlet sections 76, 78 of pipe 14. Hydraulic fluid conduits 57, 70, fill conduits 54, and vent conduits 58 may be disconnected. The magnetic sensor holder and safety light base may be placed on the body of the pipe end plugs. The pipe end plugs may be placed in a cradle to change the pipe end plugs or seal size or to inspect the pipe end plugs if immediate installation on another pipe 14 is required.

Disabling system 10 in step (8) may include disconnecting all pipe end plugs from fill conduits 54 vent conduits 58, and cables and storing each. If any test fluid remains in bleed tank 62 on secondary module 16, a fill conduit 54 from command module 12 may be connected to a vent conduit 58 from secondary module 16. Evacuation pump 40 may be used to transfer the test fluid into test fluid tank 32 on command module 12. Fill conduits 54 may be reeled in by activating the conduit reel circuit, one conduit reel 53 at a time. All non-reeled conduits and cables may be otherwise stored, except umbilical cable 30. Conduit reels 53 may be locked.

Disabling system 10 in step (8) may also include properly disposing of the test fluid from test fluid tank 32 on command module 12. If the test fluid is pure water, it may be drained on location. Otherwise a fill conduit 54 and fill pump 36 may be used to transfer the test fluid to another tank or location or do so using a transfer pump system. Test fluid tank 32 and bleed tank 62 may be emptied. Required documentation and reporting may be completed before disabling system 10. Umbilical cable 30 may be disconnected from secondary module 16 and reeled onto command unit 12. Umbilical reel 28 may be locked when complete.

Disabling system 10 in step (8) may further include removing and properly storing all video cameras 92, 94, 96 for transportation. All cable bridges may be stored. The contents of control center 18 may be secured for transportation. The power generator may be powered down. Control center 18 may be locked. Ground lead to command module 12 may be disconnected from the ground rod. The ground rod may be removed, it may be completely driven into the ground, or it may be cut at ground level. The appropriate trucks may be connected to command module 12 and secondary module 16. All support legs may be retracted and secured, and all wheel chocks may be removed. All ladders may be removed from command module 12 and secondary module 16 and properly secured. The operator may inspect command module 12 and secondary module 16 before moving to ensure that both are properly secured for travel.

While preferred embodiments of the present invention have been described, it is to be understood that the embodiments are illustrative only and that the scope of the invention is to be defined solely by the appended claims when accorded a full range of equivalents, many variations and modifications naturally occurring to those skilled in the art from a review hereof.

What is claimed is:

1. A hydrostatic pressure testing system, comprising:
a command module comprising: a control center for operating said hydrostatic pressure testing system, said control center including a computer control panel, a computer display screen, a computer storage device, and a computer program functioning to monitor, record, and control said hydrostatic pressure testing system during hydrostatic pressure testing operations; a test fluid assembly including a fill conduit, said fill conduit capable of providing a test fluid to an inlet section of a pipe to be tested in response to a command generated by said computer program; a power generation assembly capable of generating power to operate said hydrostatic pressure testing system; a fluid pumping assembly capable of increasing the fluid pressure in an internal section of said pipe during said hydrostatic pressure testing operations; a test fluid evacuation assembly capable of evacuating said test fluid from said internal section of said pipe after said pipe has undergone said hydrostatic pressure testing operations;
a hydrostatic-pressure seal assembly capable of sealing said pipe so that a predetermined hydrostatic pressure may be applied and held in said internal section of said pipe during said hydrostatic pressure testing operations for a predetermined time, said hydrostatic-pressure seal assembly being controlled by said computer program;
a secondary module operatively associated with said command module, said secondary module including a pressure-release safety assembly including a vent conduit capable of providing a fluid communication between an outlet section of said pipe and a safety valve, said safety valve in fluid communication with a bleed tank for storing an outlet flow of said test fluid from said pipe, said safety valve capable of being actuated to relieve a fluid pressure in said internal section of said pipe during said hydrostatic pressure testing operations in response to a selective condition of said hydrostatic pressure testing system.

2. The hydrostatic pressure testing system according to claim 1, wherein said power generation assembly includes a generator.

3. The hydrostatic pressure testing system according to claim 2, wherein said test fluid assembly further includes a test fluid tank for storing said test fluid and a fill pump in fluid communication with said test fluid tank, said fill pump capable of pumping said test fluid from said test fluid tank through said fill conduit to said inlet section of said pipe.

4. The hydrostatic pressure testing system according to claim 3, wherein said test fluid assembly further includes a filter in fluid communication with said test fluid tank, said filter capable of filtering said test fluid to remove impurities.

5. The hydrostatic pressure testing system according to claim 4, wherein said hydrostatic-pressure seal assembly includes a pair of seal means.

6. The hydrostatic pressure testing system according to claim 5, wherein said seal means each include an internal pipe locking means or an external pipe locking means to secure said seal means to said pipe.

7. The hydrostatic pressure testing system according to claim 6, wherein said seal means each comprises a mechanical seal, a pneumatically-actuated seal, or a hydraulically-actuated seal.

8. The hydrostatic pressure testing system according to claim 7, wherein said pipe is open-ended, wherein said inlet section of said pipe is an inlet end, wherein said outlet section of said pipe is an outlet end, and wherein said seal means each comprises a hydraulically-actuated pipe end plug, one of said plugs sealing said inlet end of said pipe and the other plug sealing said outlet end of said pipe.

9. The hydrostatic pressure testing system according to claim 7, wherein said seal means each comprises a hydraulically-actuated seal, and wherein said hydrostatic pressure testing system further comprises a hydraulic assembly capable of supplying a hydraulic fluid to actuate said hydraulically-actuated seal.

10. The hydrostatic pressure testing system according to claim 9, wherein said hydraulic assembly includes a hydraulic fluid reservoir, a hydraulic fluid pump in fluid communication with said hydraulic fluid reservoir, and a hydraulic fluid conduit providing fluid communication between said hydraulic fluid pump and said hydraulically-actuated seals to actuate said seals.

11. The hydrostatic pressure testing system according to claim 5, wherein said fluid pumping assembly includes two or more pumps in fluid communication with said internal section of said pipe.

12. The hydrostatic pressure testing system according to claim 11, wherein said test fluid evacuation assembly includes an evacuation pump in fluid communication with said internal section of said pipe, said evacuation pump capable of pumping said test fluid remaining in said internal section of said pipe after said pipe has undergone hydrostatic pressure testing operations.

13. The hydrostatic pressure testing system according to claim 12, wherein said pressure-release safety assembly further includes a safety-valve pneumatic compressor, and wherein said safety valve is a pneumatically-actuated valve.

14. The hydrostatic pressure testing system according to claim 13, further comprising a video surveillance assembly comprising one or more video cameras, a video image display screen capable of display an image captured by each of said one or more video cameras, and a video storage device for storing said images, said video display screen and video storage device being housed in said control center.

15. The hydrostatic pressure testing system according to claim 14, wherein said video surveillance assembly is capable of being controlled and monitored remotely.

16. The hydrostatic pressure testing system according to claim 14, further comprising a plurality of pressure sensors capable of detecting a fluid pressure in said internal section of said pipe during hydrostatic pressure testing operations, said computer display screen capable of displaying said detected fluid pressure, said computer storage device capable of storing said detected fluid pressure.

17. The hydrostatic pressure testing system according to claim 16, wherein said computer program is capable of determining whether any gas is held in said internal section of said pipe based on said detected fluid pressure and a detected volume of said test fluid pumped by said fill pump.

18. The hydrostatic pressure testing system according to claim 16, further comprising a plurality of temperature sensors capable of detecting an internal temperature in said internal section of said pipe and an external temperature surrounding an outer surface of said pipe during hydrostatic pressure testing operations, said computer display screen capable of displaying said detected temperatures, said computer storage device capable of storing said detected temperatures.

19. The hydrostatic pressure testing system according to claim 1, wherein said command module and said secondary module are each self-contained and adapted for mobility.

20. The hydrostatic pressure testing system according to claim 1, wherein said hydrostatic pressure testing system is capable of conducting simultaneous hydrostatic pressure testing operations on a plurality of pipes, and wherein said test fluid assembly further includes one or more additional fill conduits, each fill conduit capable of providing said test fluid to an inlet section of one of said plurality of pipes.

21. The hydrostatic pressure testing system according to claim 20, wherein said pressure-release safety assembly further includes one or more additional vent conduits and one or more additional safety valves, each of said vent conduits capable of providing a fluid communication between said outlet section of one of said plurality of pipes and one of said safety valves.

22. The hydrostatic pressure testing system according to claim 1, wherein said selective condition is a failure of said power generating assembly, a detection of a leak in said hydrostatic-pressure seal assembly, a detection of a movement of said hydrostatic-pressure seal assembly and an activation of one of a plurality of manual override switches provided on said hydrostatic pressure testing system.

23. The hydrostatic pressure testing system according to claim 22, wherein at least one of said plurality of manual override switches is located at an external location on said command module, at least one of said plurality of manual override switches is located within said control center, and at least one of said plurality of manual override switches is located at an external location on said secondary module.

24. A method of hydrostatic pressure testing, comprising the steps of:
  a) providing a hydrostatic pressure testing system comprising: a command module comprising: a control center for operating said hydrostatic pressure testing system, said control center including a computer control panel, a computer display screen, a computer storage device, and a computer program functioning to monitor, record, and control said hydrostatic pressure testing system during hydrostatic pressure testing operations; a test fluid assembly including a fill conduit, said fill conduit capable of providing a test fluid to an inlet section of a vessel to be tested in response to a command generated by said computer program; a power generation assembly capable of generating power to operate said hydrostatic pressure testing system; a fluid pumping assembly capable of increasing the fluid pressure in an internal section of said vessel during said hydrostatic pressure testing operations; a test fluid evacuation assembly capable of evacuating said test fluid from said internal section of said vessel after said vessel has undergone said hydrostatic pressure testing operations; a secondary module operatively associated with said command module, said secondary module including a pressure-release safety assembly including a vent conduit capable of providing a fluid communication between an outlet section of said vessel and a safety valve, said safety valve in fluid communication with a bleed tank for storing an outlet flow of said test fluid from said vessel, said safety valve capable of being actuated to relieve a fluid pressure in said internal section of said vessel during said hydrostatic pressure testing operations in response to a selective condition of said hydrostatic pressure testing system;
  b) filling said internal section of said vessel with said test fluid;
  c) applying a predetermined fluid pressure to said internal section of said vessel;
  d) monitoring said fluid pressure in said internal section of said vessel;
  e) recording said fluid pressure in said internal section of said vessel;
  f) evaluating said fluid pressure in said internal section of said vessel to determine if said fluid pressure has been maintained in a specified range for a prescribed period of time.

25. The method according to claim 24, wherein said vessel of said hydrostatic pressure testing system comprises a pipe; wherein said hydrostatic pressure testing system further comprises a hydrostatic-pressure seal assembly capable of sealing said pipe so that a predetermined hydrostatic pressure may be applied to an internal section of said pipe during said hydrostatic pressure testing operations, said hydrostatic-pressure seal assembly being controlled by said computer program; and wherein the method further comprises the step of:
  a1) sealing said pipe by operatively connecting said hydrostatic seal assembly thereto.

26. The method according to claim 24, wherein said hydrostatic pressure testing system further includes: a pressure sensor in said internal section of said vessel which is operatively controlled by said computer program, said pressure sensor detecting said fluid pressure in said internal section of said vessel; an internal temperature sensor in said internal section of said vessel which is operatively controlled by said computer program, said internal temperature sensor detecting an internal temperature in said internal section of said vessel; an external temperature sensor external to said vessel which is operatively controlled by said computer program, said external temperature sensor detecting an external temperature at an outer surface of said vessel; and wherein the method further comprises the steps of:
  g) monitoring said internal and external temperatures;
  h) recording said internal and external temperatures;
  i) evaluating said internal and external temperatures to determine if said temperatures influenced said fluid pressure monitored in said internal section of said vessel.

27. The method according to claim 26, wherein steps (b) and (c) comprise using said computer program to determine whether any gas remains in said internal section of said vessel based on said detected fluid pressure and a detected volume of test fluid pumped by said fluid pumping assembly.

28. The method according to claim 26, further comprising the steps of:
  j) evacuating said test fluid remaining in said internal section of said vessel at the completion of said hydrostatic pressure testing operations;
  k) removing said hydrostatic-pressure assembly from said vessel.

29. The method according to claim 24, wherein steps (b) through (f) are simultaneously performed on a plurality of vessels.

* * * * *